Sept. 1, 1959 D. HEYER 2,901,928
POWER OPERATED FEED DEVICE
Filed July 30, 1956 3 Sheets-Sheet 1
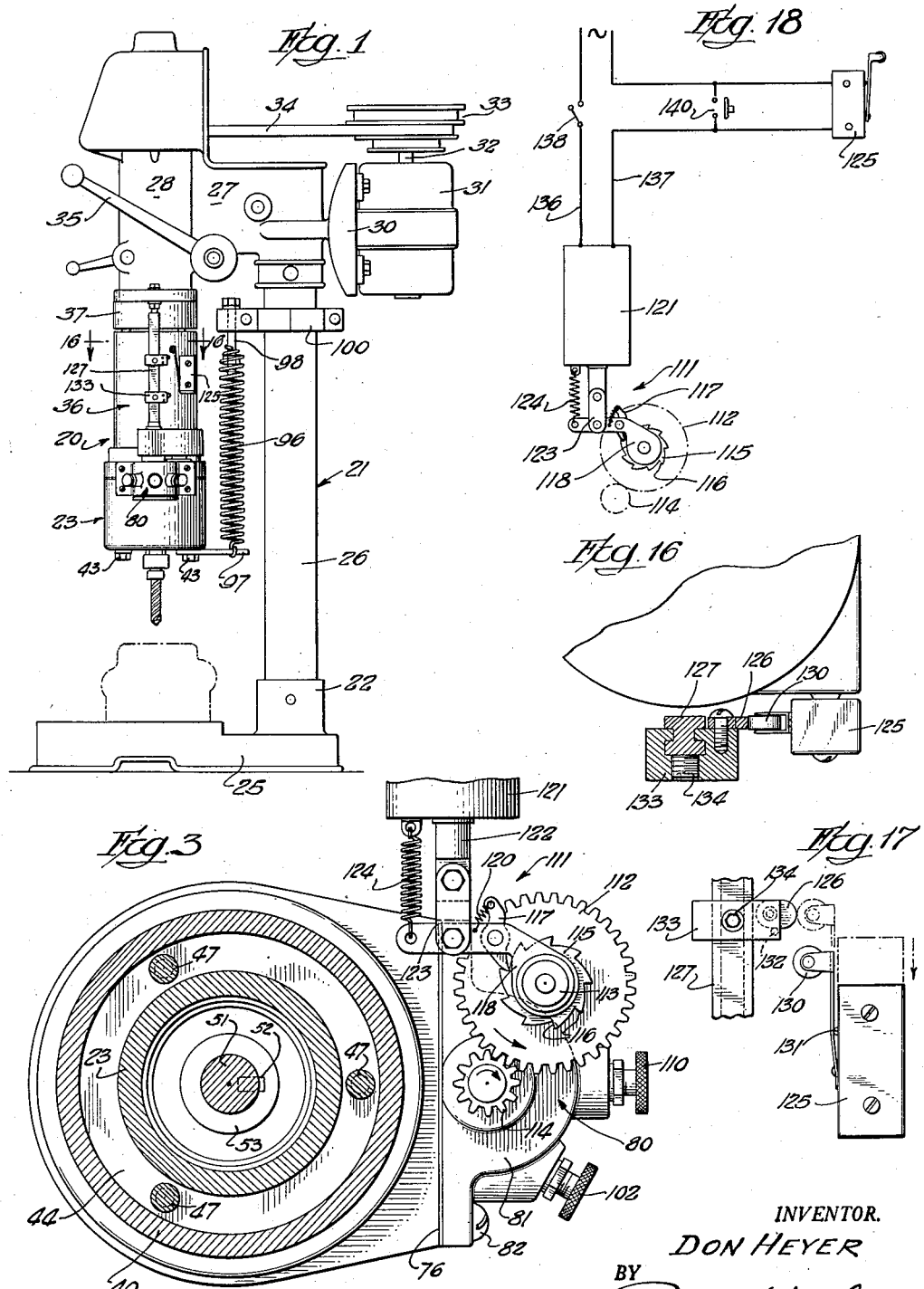
INVENTOR.
DON HEYER
BY Paul A. Weilein
ATTORNEY.

Sept. 1, 1959    D. HEYER    2,901,928
POWER OPERATED FEED DEVICE
Filed July 30, 1956    3 Sheets-Sheet 2
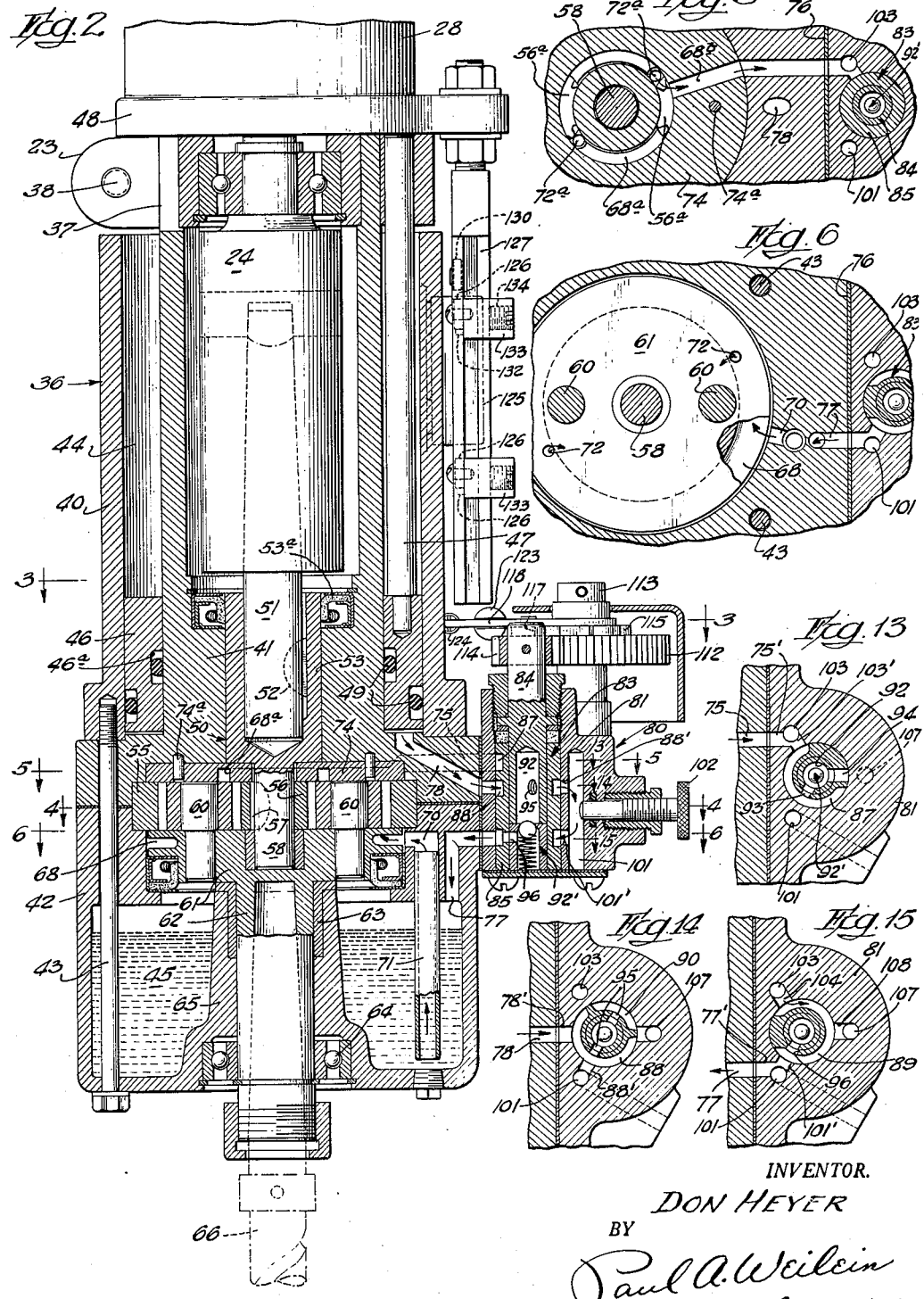
INVENTOR.
DON HEYER
BY
Paul A. Weilein
ATTORNEY.

Sept. 1, 1959  D. HEYER  2,901,928
POWER OPERATED FEED DEVICE
Filed July 30, 1956  3 Sheets-Sheet 3
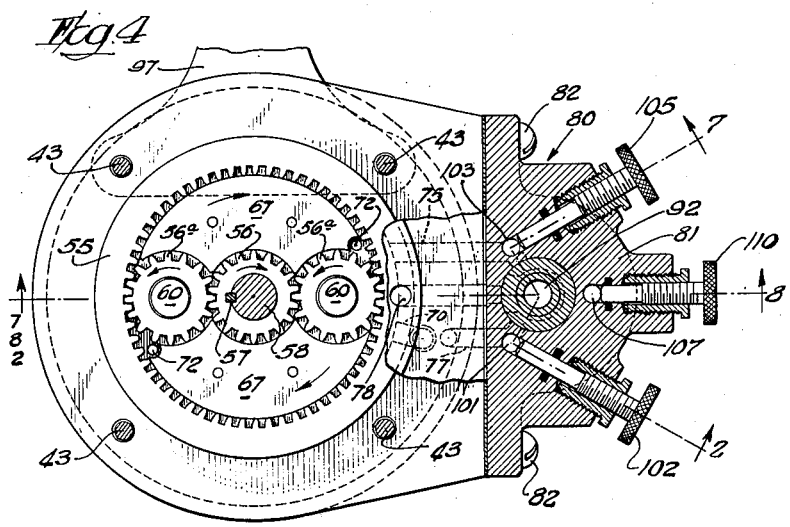
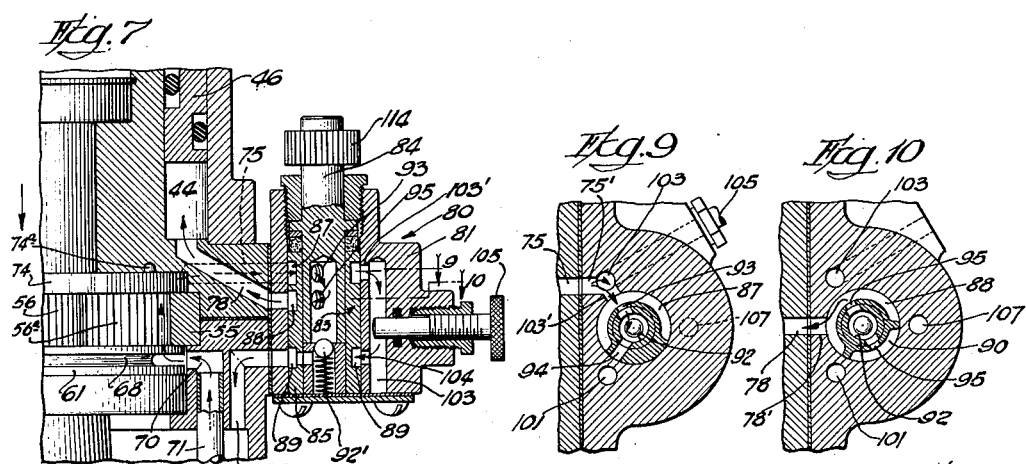
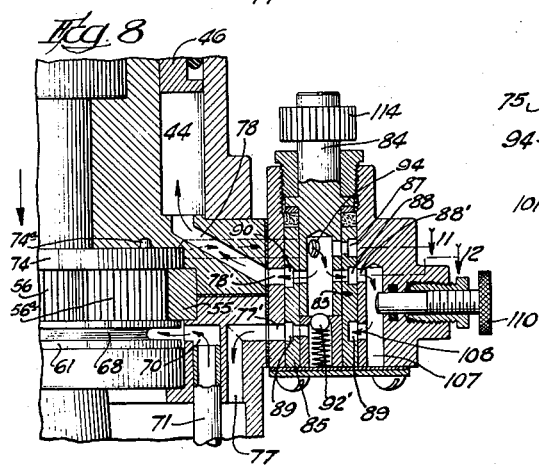
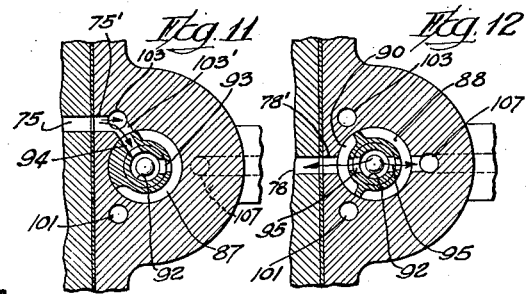
INVENTOR.
DON HEYER
BY
Paul A. Weilein
ATTORNEY.

United States Patent Office 2,901,928
Patented Sept. 1, 1959

2,901,928

POWER OPERATED FEED DEVICE

Don Heyer, El Monte, Calif.

Application July 30, 1956, Serial No. 600,830

30 Claims. (Cl. 77—33.5)

This invention relates generally to machine tools. It is more particularly directed to feed mechanisms for a machine tool of the type having a power driven shaft, the feed mechanism serving to convert the machine tool from a manually or semi-automatically operated device to one having fully automatic features.

An object of this invention is to provide in a machine having a reciprocating carrier and a power driven rotatable shaft journalled in the carrier and reciprocating therewith, a feed device having an element or tool for performing an operation on a piece of work, and means for converting the rotary motion of the shaft into fluid pressure to effect movement of such element or tool for performing an operation on a piece of work.

An object of this invention also is to provide a power feed device which may be produced as an attachment for a drill press, or other machine, having a movable carrier for a tool, or other work-performing element, which will cause the tool or element operated by the machine to be automatically moved toward the work and then be retracted after having travelled a predetermined distance.

Another object of this invention is to provide a device of the character described, which embodies therein novel hydraulic means for causing a power driven tool, or other work-performing element, to automatically advance toward and be retracted from the work.

A further object is to provide the hydraulic tool advancing device having control means whereby the tool may be caused to move at various rates during different portions of the advancing movement, so that the tool may make a rapid advance, a controlled working stroke and a fast retraction.

A still further object is to provide a hydraulic tool moving device having electrical means for controlling the operation of the tool moving mechanism, switch means being actuated by relatively movable parts of the attachment so that automatic operation will result, the switch means being adjustable to vary the extent of movement of the tool at the various rates.

Another object of the invention is to provide a power feed device for a machine tool with a power driven shaft, the device having a motion transmitting mechanism to be driven by the shaft of the machine tool and to in turn operate pump means to supply hydraulic fluid pressure to effect relative movement of different parts of the device, valve means being provided to control the flow of hydraulic fluid and govern the relative movement of the parts, the valve means being actuated in response to the relative movement of such parts.

A more specific object of this invention is to provide a power feed device for a drill press of the type having a frame on which a reciprocable carrier, commonly known as a quill, supports a power driven shaft, or spindle, the device having a body attachable to the quill and forming a piston chamber for receiving a piston which is attached to the drill press frame, a motion-transmitting mechanism being arranged in the body and connected for operation by the drill press shaft. The motion transmitting mechanism includes a gear train which transmits rotary movement to a tool holding and operating shaft and in so doing also functions as a pump to generate hydraulic pressure which is supplied to the piston chamber to effect relative movement between the piston and the body. This movement advances the tool carrying shaft or spindle. The body receives a valve mechanism which is electrically controlled to vary the flow of hydraulic fluid and consequently the rate of relative movement of the parts of the device.

This invention possesses many other advantages and has other objects which may be made more easily apparent from a consideration of one embodiment of the invention. For this purpose there is shown one form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is a side elevational view of a drill press equipped with an automatic tool feeding device formed in accordance with the present invention;

Fig. 2 is a vertical longitudinal sectional view taken on the staggered line 2—2 of Fig. 4;

Fig. 3 is a horizontal sectional view taken through the device on the plane indicated by the line 3—3 of Fig. 2;

Fig. 4 is a similar view taken on the plane indicated by the line 4—4 of Fig. 2, and showing part of a combination motion transmitting and pumping mechanism used in the attachment;

Figs. 5 and 6 are fragmentary horizontal sectional views taken on the planes indicated by lines 5—5 and 6—6, respectively of Fig. 2;

Figs. 7 and 8 are fragmentary vertical sectional views taken as indicated by lines 7—7 and 8—8, respectively, of Fig. 4, certain parts of a control valve used in the device being shown out of normal position to facilitate an understanding of the invention;

Figs. 9 to 15, inclusive, are fragmentary horizontal sectional views taken through the control valve mechanism on lines 9—9, 10—10 of Fig. 7, lines 11—11, 12—12 of Fig. 8, lines 13—13, 14—14 and 15—15 of Fig. 2, respectively, to show different parts of the valve and different positions of operation of such parts;

Fig. 16 is a sectional view taken on the line 16—16 of Fig. 1, with parts shown in top plan;

Fig. 17 is a fragmentary elevational view of the switch and actuating means shown in Fig. 16; and Fig. 18 is a diagrammatic view of an electroresponsive valve actuating means and circuit therefor.

As illustrated in the drawings, the tool feed device 20 forming the subject matter of the invention is designed particularly for use on a machine tool, such as a drill press or other machine having a movable work-performing element. The press here shown is designated generally by the numeral 21, and includes a supporting frame 22, a carrier, or quill, 23 supported on the frame for reciprocatory movement, and a shaft or spindle 24 journalled in the quill for reciprocation therewith. The drill press shown in Fig. 1 has a base 25, a column 26, a head 27 with a forward vertical quill guiding housing 28 and a rearward motor supporting section 30. The latter section is provided with a driving motor 31 having a vertical shaft 32 carrying a pulley cluster 33, a driving belt 34 being trained around one of the pulleys in the cluster and another pulley, not shown, in the head portion 27 of the press. The last-mentioned pulley has a suitable driving connection with the spindle 24 to effect its rotation, when the motor 31 is operated. This connection also permits the carrier or quill 23 to be raised and lowered without interfering with the rotation of the shaft. As is usual in a drill press of the character shown, a lever 35 is provided to manually effect the reciprocation of the quill and spindle but during the use of the device comprising the invention herein, the lever 35 is not generally used except during the operation of setting up the device for particular jobs.

The device 20 includes a body indicated generally by the numeral 36, which is clamped by a split ring section 37 and bolt 38 at its upper end to the lower end of the carrier or quill 23 of the press for reciprocation therewith. The body 36 includes a number of major pieces 40, 41, and 42 secured together by bolts 43 to form an annular piston chamber 44 and a reservoir 45 for containing a suitable hydraulic fluid.

The body piece 40 serves as a cylinder for a ring-like piston 46 stationarily held in the chamber 44 defined between the body pieces 40 and 41. This piston is held against movement by a plurality of bars 47 and a supporting ring 48, which latter is fixed to the housing 28. The piston 46 has grooves 46a formed in its inner and outer walls to receive O rings or other suitable seals 49 to prevent the escape of hydraulic fluid from the piston chamber.

Body pieces 40 and 41 combine to form the piston chamber 44 while pieces 41 and 42 cooperate to form the reservoir 45 and spaces for receiving the spindle 24 and motion transmitting mechanism 50 which is connected for operation by the spindle. In the form of the invention illustrated, the connection is effected by a tapered shank driving rod 51 disposed in the spindle 24 and projecting from the end thereof. The rod 51 is keyed as at 52 to a shaft section 53 journaled in body piece 41, a suitable oil retaining seal 53a being disposed around shaft section 53.

The motion transmitting mechanism 50 (see Figs. 2 and 4) includes gearing having an internal ring gear 55 and a plurality, in this instance a pinion 56 and two pinions 56a. The ring gear 55 is held stationary by being clamped between body pieces 41 and 42. The pinion 56 is keyed, as at 57, to a reduced extension 58 of the shaft section 53. The pinions 56a are disposed in meshing relationship with the teeth of the pinion 56 and the ring gear 55. The pinions 56a are journalled on stub shafts 60 which project upwardly from a disk-like head 61 formed on the upper end of a second shaft section 62. The shaft section 62 is journalled in a sleeve bearing 63 and ball bearing 64 mounted in body piece 42. The sleeve bearing 63 is inserted in the upper end of a boss 65 projecting upwardly from the bottom wall of the body piece 42 into the reservoir 45. This construction locates the joint between the shaft 62 and bearing 63 above the oil level in the reservoir to prevent leakage. It will be noted, that when the shaft of the drill press is revolved, it will cause a similar rotation of shaft section 53 and pinion 56. Since the latter meshes with pinions 56a which in turn mesh with ring gear 55, pinions 56a will be rotated also and caused to travel around the axis of pinion 56. This movement is transmitted through the stub shafts 60 to the second shaft section 62 and the drill or other tool 66, indicated by dotted lines in Fig. 2, secured for rotation therewith.

Attention is called to the fact that this arrangement of shafts, ring gear and pinion serves as a speed reducing transmission to cause the rotation of the drill 66 or other tool element at the most desirable rate.

As previously mentioned, parts of the motion transmitting mechanism also function as a pump to generate hydraulic pressure employed to effect relative movement of the body and piston of the device. Fig. 2 shows the disk-like head on the second shaft section 62 and Fig. 4 shows that this head has two somewhat crescent-shaped blocks 67 on the upper side, the blocks being finished on the outer sides to provide a running fit with the teeth on the ring gear and on the inner sides to provide a similar fit with the teeth of the pinions 56 and 56a. The head 61 has an annular groove 68 formed in the peripheral edge (see Figs. 2 and 6), the groove communicating with an inlet passage 70 and tube 71 (see Fig. 2), extending from the body piece 42 downwardly into the reservoir 45. The head 61 has one or more openings 72 (see Fig. 6), extending upwardly from the groove 68 to predetermined spaces between the pinions 56a and ring gear 55 to admit oil drawn through tube 71 from the reservoir.

The pump assembly includes a top plate or disk 74 (see Fig. 2) which has a circular groove 68a in the under side thereof and is provided, as shown in Fig. 5, with outlet openings 72a which communicate the groove 68a with certain spaces between pinions 56 and 56a. The groove 68, through a pasage 68b and disk 74, communicates with an outlet passage 75 formed in body section 41. The disk 74 is suitably secured to the body piece 41 by means of the pins 74a, to maintain the outlet openings 72a in communication with the proper spaces between the pinions.

As the pinions 56 and 56a revolve, the oil is transferred thereby from openings 72 to outlet openings 72a from whitch it flows to groove 68a, and thence through passages 68b and 75 leading to a valve mounting surface 76 formed on one side of the body pieces 41 and 42. The body piece 42 has an oil return passage 77 leading from the surface 76 back to the reservoir. The body piece 41 is also provided with a passage 78 leading from the surface 76 to the piston chamber 44.

To control the flow of oil to the piston chamber and consequently the relative movement between the piston 46 and body 36, a valve mechanism 80 is attached to the finished surface 76. The valve mechanism 80 includes a casing 81 which is secured to the body 36 by screws 82 and supports a tubular rotary valve element 83. The latter element 83 is composed of an inner stem 84 press fitted in an outer sleeve 85 which latter is provided with arcuate grooves 87, 88, 89 and 90, on the exterior thereof and extending partly therearound. The stem 84 has a central bore 92 extending upwardly therein from the lower end thereof. The assembly composed of the stem 84 and the sleeve 85 is provided with laterally extending ports 93, 94, 95 and 96 (see Figs. 9, 10 and 15) which open into the bore 92. As shown in Figs. 2, 7, and 8, which illustrate longitudinal sections of the valve mechanism, the grooves 87, 88 and 89 register, respectively, with extensions 75′, 78′ and 77′ (see Figs. 9, 10 and 15) of pump outlet passage 75, piston chamber passage 78, and return passage 77, these extensions being formed in casing 81 and communicating with the passages in the body when the casing is secured in place on the body.

Figs. 2, 7 and 8, are, as indicated by the lines 2—2, 7—7 and 8—8 of Fig. 4, sections showing important parts of the valve mechanism in different positions for controlling fluid flow. Fig. 2, for example, shows the valve mechanism in position to permit the fluid to flow from the piston chamber 44 back to the reservoir 45 and consequent movement of the body 36 back to initial or retracted position. The parts are shown in the positions occupiled just after this retraction has been completed.

Figs. 13, 14 and 15, taken as indicated by lines 13—13, 14—14 and 15—15 of Fig. 2, show the relation of the ports 93, 94, 95 and 96 and grooves 87, 88, 89 and 90 to the pump outlet passage 75, piston chamber passage 78 and oil return passage 77, respectively. The force to retract the body of the attachment is provided by a coil spring 96′ having one end connected to the lower end of the attachment by a plate 97 and the other end adjustably connected by a screw 98 to a bracket 100 clamped to the column of the drill press. The force of spring 96′ urges the body in an upward direction and causes piston 46 to move into the piston chamber 44. Oil thus displaced flows as shown in Figs. 2 and 14, through passage 78 to groove 88, thence through a port 88' in the casing 81 and into a vertical passage 101 in the valve casing 81. From the passage 101 the fluid flows through a lateral port 101' in the casing 81 (see Figs. 2 and 15) into the groove 89 in the valve sleeve 85 from which it flows through oil return passage 77 to the reservoir 45. The casing 81 of the valve mechanism is provided with an adjustable screw 102 which extends into the passage 101 and may be utilized in the manner of a needle valve to vary the effective fluid conducting capacity of the passage 101. Adjustment of this screw will vary the rate of retraction of the attachment body.

When the valve mechanism 80 is set as shown in Figs. 2, 13 and 15, to cause the retraction of the attachment body 36 and the tool 66 carried thereby, the output of the pump is returned directly to the reservoir 45. The fluid is conducted from the pump outlet passage 75 (see Fig. 13) through extension passage 75' into a vertical passage 103 in the casing 81. The casing 81 is provided with an adjustable screw 105 (see Fig. 4) which may be moved in and out of passage 103 (see Fig. 7) for varying the effective flow capacity of this passage. Passage 103 (see Fig. 15) at its lower end, communicates with the arcuate groove 89 through a short lateral passage 104 in the casing 81. Pump fluid discharges from the groove 89 (see Fig. 15) through the lateral port 101' into the passage 77', thence through return passage 77, leading back to the reservoir 45. The flow of pump fluid through the passage 103 is retarded in accordance with the adjustment of the screw 105. This causes a back pressure to build up and it is therefore desired to provide another flow channel to conduct the pump fluid back to the reservoir. This is accomplished by having some of the pump fluid entering the extension passage 75' from passage 75 (see Fig. 13) to flow through a short lateral port 103' in the casing 81, into the arcuate groove 87. Fluid entering the groove 87 passes through port 93 into the bore 92 centrally of the valve element 83. At the lower end of the bore 92 is a spring loaded ball check valve 92' which controls the port 96 (see Figs. 2 and 15). The ball check valve 92' normally closes the lower end of the bore 92 but will open this lower end responsive to the pressure build-up occasioned by having the screw 105 adjusted to obstruct flow of the fluid through passage 103. Upon the opening of the check valve 92', the fluid will pass through port 96 (see Figs. 2 and 15), into the arcuate groove 89, thence through the short passage 77' and the return passage 77, back to the reservoir 45. The spring of the check valve 92' is of such force as to permit the valve 92' to open only when the aforesaid build-up of pressure occurs during the return of the pump fluid to the reservoir.

Figs. 7, 9 and 10 show the valve parts disposed to cause the rapid traverse portion of a cycle of movement of the body 36 and tool 66. At this time, the valve element 83 is disposed to establish communication between the pump output passage 75 and port 93 (see Fig. 9). Fluid from the pump will flow into the bore 92, thence downwardly and out (see Fig. 10) through one of the ports 95 to the groove 88. When the valve element 83 is so positioned, groove 88 communicates through passage 78' with passage 78 leading to the piston chamber 44. Fluid at pump pressure admitted in this manner to the piston chamber 44 will cause the body 36 and tool 66 to move downwardly, against the force of spring 96', causing the tool 66 to approach the work 106, indicated by dotted lines in Fig. 1. During this flow of fluid from the pump to the piston chamber 44, some of the pump fluid passes through extention passage 75' (see Fig. 9) into vertical passage 103 from whence the fluid is returned to the reservoir 45 through lateral port 104 (see Fig. 7) into passage 89 which then communicates through passage 77' with return passage 77 leading to the reservoir. Inasmuch as the port 104 is below the screw 105, the rate of movement of the body 36 and tool 66 will be governed by the position of the screw 105. If the passage 103 is fully obstructed by screw 105, the body 36 and tool 66 will move at maximum speed; if the passage is only partially obstructed, some of the pump output will be by-passed to the reservoir 45 and the body 36 and tool 66 will move at a slower rate.

After the body 36 and tool 66 have travelled a predetermined distance, the valve mechanism 80 will be actuated to cause some of the pump output to be by-passed and the rate of movement of the body to be reduced. This adjustment of the valve mechanism 88 usually takes place just before the drill or other tool reaches the work. After such adjustment the valve parts will occupy the positions shown in Figs. 8, 11 and 12, in which port 94 communicates with pump output passages 75 and 75' through port 103'. Fluid from port 94 will flow into bore 92 (see Fig. 11) of valve element 83 and outwardly through one of the ports 95 (see Figs. 8 and 12) to groove 90 which at such time communicates through passages 78 and 78' with the piston chamber 44. The other port 95 (see Fig. 12) communicates through groove 88 and port 88' in the casing 81, with a third vertical passage 107 in the casing 81, such passage communicating through lateral port 108 with the groove 89 which latter is then in communication with passage 77 (see Fig. 8) leading to the reservoir 45. As shown in Fig. 8, the casing 81 has a third adjustable screw 110 for varying the effective capacity of passage 107. By moving the screw 110 into or out of the passage 107, the volume of fluid by-passed and the rate of movement of the body 36 and the tool 66 may be controlled as before.

The valve element 83 is automatically moved between the positions shown and described by any suitable mechanism, such as, the solenoid operated pawl and ratchet device 111 shown in Fig. 3. This device includes a gear 112 which is supported for rotation in a horizontal plane by a shaft 113 projecting upwardly from the valve casing 81. The teeth of gear 112 mesh with those on a pinion 114 fixed to the upper end of valve stem 84. When the gear 112 revolves, rotary motion is imparted to the valve unit 83. Shaft 113 is provided with a ratchet wheel 115 having ratchet teeth 116 for engagement by a pawl 117 which is pivotally carried on a lever 118 mounted for swinging movement about the shaft 113. One end of pawl 117 is urged toward the ratchet wheel 115 by a small tension spring 120. When the lever 118 is swung in one direction, counterclockwise in this instance, the pawl 117 engages one of the ratchet teeth 116 on the wheel 115, and the gear 112 is rotated. Rotary motion is imparted thereby to the valve stem 84 and the valve 83. The lever 118 is moved in such direction by a solenoid 121, the armature 122 of which is connected with the lever 118 by a link 123. Return movement is imparted to the lever by a spring 124 connected at its ends with the lever and the solenoid frame. During this return movement the pawl 117 rides over the teeth on the wheel 116 and the valve unit 83 remains stationary.

It is important to note that in the present embodiment of the invention the valve unit 83 has three positions; the first, to cause rapid traverse of the tool; the second, to cause controlled working movement; and the third, to cause controlled retraction of the tool from the work. The stroke of the solenoid armature and the relative sizes of the gear 112 and pinion 114 are calculated to cause the valve to rotate through an angle of 120 degrees on each actuation of the solenoid.

Solenoid operation is controlled by a micro-switch 125 and spaced dogs 126 adjustably mounted on a bar 127 projecting downwardly at the side of the body 36. The bar 127 is secured to the ring 48 which is fastened to the drill press frame. A switch is mounted on the body 36 and moves with it during advancement and retraction strokes. A lever 128 is fixed to the switch case, the lever having a roller 130 for engagement with the dogs 126 during movement of the body 36. When a dog 126 engages the roller 130 and moves it, a switch actuating pin 131 is moved to close the contacts, not shown and complete the circuit to the solenoid 121. The dogs 126 are pivotally supported, their movement in one direction being restricted by pins 132 so that the switch will be actuated when the body 36 moves in one direction only. When the dogs 126 are engaged by the roller 130 during movement of the body 36 in the opposite direction, the dogs will pivot out of the way and the switch 125 will not be actuated. The dogs 126 are mounted on blocks 133 slidably carried by the bar 127. Set screws 134 maintain the positions of adjustment of the blocks 133.

As shown in Fig. 18, the electrical circuit 135 includes lead wires 136 and 137 which connect with a suitable source of current, not shown. A main switch 138 is positioned in one of the leads and during the operation of setting up the machine for a particular run this main switch remains open. The blocks 133 are set so that the valve 83 will be actuated at the desirable positions of the body 36 in its stroke. After the setting up operation is completed the main switch may be closed. The device is then in condition for operation. At this time the body 36 will be retracted. The motor 31 is controlled by a suitable switch mechanism, not shown, and, of course, must be in operation to effect the operation of the device of this invention. A cycle of operation of the device is initiated by momentarily closing a suitable starting switch 140 connected in parallel with the micro-switch 125. When switch 140 is closed, the solenoid 121 will be energized to move valve 83 from the position shown in Figs 2, 13, 14 and 15, to the position shown in Figs. 7, 9 and 10, thereby causing rapid approach of the body 36 and tool 66, the body then moving relative to the rods 47 and stationary piston 46. Just before the tool engages the work, the first dog 126 will be engaged by the roller 130 and switch 125 will be closed to again energize the solenoid 121. The valve 83 will again be moved to the position shown in Figs. 8, 11 and 12 thereby causing the controlled work feeding stroke. When the tool has travelled the desired distance on this working stroke, the second dog 126 will be engaged by the roller 130 and the switch 125 will again by closed to energize the solenoid 121 once more. This time the valve 83 will be moved to the position (see Figs. 2, 13, 14 and 15) to cause retraction of the body and tool.

It is, of course, obvious that starting switch 140 could be located so that it would be actuated by the body 36 at the end of the retractive stroke and the succeeding cycle would then be automatically initiated.

As previously explained, the rates of movement of the body 36 during the various stages of the cycle of operation may be varied through the adjustment of the by-pass valves 102, 105 and 110.

It is believed that the construction and operation of the device forming the subject matter of the invention is clear from the foregoing description but to insure a complete understanding of the device the operation is briefly summarized as follows:

Prior to the operation of the attachment the device is set up for a particular job, such as drilling a certain size hole to a certain depth in each of a quantity of articles, by setting the blocks 133 on the bar 127 at the required positions. The device may be advanced or lowered and retracted during this setting up operation as many times as desired through the operation of the lever 35. It should be understood at this time that when the attachment is raised or lowered by the lever 35, valve 83 must be in the position to establish communication between piston chamber 44 and the reservoir.

When the apparatus is properly set, motor 31 is started to cause the rotation of shaft 24. This motion is transmitted by spindle 51, key 52 and shaft 53 to pinions 56 and 56a causing them to revolve and causing pinions 56a to rotate around the axis of pinion 56. This rotation is transmitted to shaft 62 and the drill 66 or other tool supported thereby. The rotation of the gears causes fluid to be pumped from the reservoir 45 through the tube 71 and connected passages to pump output port 75 which leads to the inlet of valve mechanism 80. Under normal conditions, the operations of the attachment will terminate with the valve 83 in position to cause the retraction of the attachment body. In this position, the pump output is returned to the reservoir in the manner hereinbefore noted and the piston chamber 44 is also connected with the reservoir.

After the motor 31 starts to operate and the fluid output is available, the main switch 138 may be closed and the apparatus is then in condition for operation which is initiated by momentarily closing switch 140.

It is to be understood that the power operated feed device embodying the present invention may be used in power operated machines other than the drill press here shown provided the machine is equipped with a reciprocable carrier for a work-performing element whether the latter is a drill or any other tool or element for performing work, and wherein a power driven shaft is movable with the carrier. Thus, the term "tool" as used throughout this specification and the claims appended hereto, is intended to cover any form of work-performing element which may be operated by such a reciprocable carrier by the manner herein noted.

I claim:

1. A device for use in a machine of the type having a frame, a carrier reciprocable on the frame and a power driven rotary shaft; said device comprising: means providing relatively movable body and piston members surrounding said shaft, one of said members being operatively engaged with said frame and the other being provided with an open end adapted to be connected with said carrier with said shaft extending into said body member through said open end; pump means supported by said other member; means drivingly connecting said pump means with said shaft; said pump means including a source of fluid; and means for applying fluid under pressure from said pump means to said body and piston members to cause relative movement thereof.

2. A device for use in a machine of the type having a frame, a carrier reciprocable on the frame and a power driven rotatable shaft; said device comprising: means providing relative movable body and piston members one of which is operatively engaged with said frame and the other having an open end adapted to be connected with said carrier so that said shaft projects into said body through said open end; said body member surrounding said shaft and said piston member; pump means carried by said other member in coaxial relation thereto; means connecting said pump means for operation by said shaft, said pump means including a source of fluid; means for applying fluid under pressure to said body and piston to cause relative movement thereof; and valve means connected with said pressure applying means for controlling the application of fluid under pressure to said body and piston to govern the relative movement thereof.

3. An attachment for a machine of the type having frame means, carrier means reciprocable on said frame means and a power driven shaft rotatably supported by said carrier means; said attachment comprising: body means open at one end; means for attaching said body means to the carrier means for movement therewith and so that said shaft projects from said carrier means into said body means through said open end; said body means defining a piston chamber surrounding said shaft; piston means disposed in said piston chamber and operatively engaged with the frame means; pump means enclosed within said body means in axially spaced relation to said chamber; means operatively connecting said pump means with said power driven shaft; said pump means including a source of hydraulic fluid; means communicating with said pump means and said piston chamber; and valve means connected with said communicating means operable to control fluid flow from said pump means to said piston chamber and consequent relative movement of said body and piston means.

4. An attachment for a machine of the type having frame means, carrier means reciprocable on said frame means and a power driven shaft rotatably supported by and extending from said carrier means; said attachment comprising: body means being open at one end; means for attaching said body means to said carrier means for movement therewith and so that said shaft projects through said open end into said body means; said body means providing a piston chamber surrounding said shaft, said body means providing a reservoir for containing fluid; piston means disposed in said piston chamber; means connected with said frame means holding said piston means against movement relative to said body means; pump means in said body means, said pump means being operatively connected with the power driven shaft of said machine; conduit means communicating said pump means with said reservoir and said chamber; and valve means connected with said conduit means operable to control fluid flow from said pump means to said piston chamber and from the latter to said reservoir to govern relative movement of said body and piston means.

5. A power feed device for a machine having frame means; carrier means reciprocable on said frame means, and a power driven rotatable shaft, comprising: body means having an open end; mounting means for attaching the body means to the carrier means so that said shaft extends into said body means through said open end; said body means defining a piston chamber into which said shaft extends; means on said body means for mounting thereon a work-engaging member; piston means disposed in said piston chamber; means connecting said piston means with said machine frame; pump means mounted within said body means between said piston chamber and said means for mounting said work engaging member on said body; said pump means including a source of hydraulic fluid; means operatively connecting said pump means with said shaft; and valve means communicating with said pump means and said piston chamber, operative to control fluid flow from said pump means to said piston chamber and consequent relative movement of said body and piston means for moving said work-engaging member into and from a position for performing an operation on a piece of work.

6. A feed device for a machine having frame means, carrier means reciprocable on said frame means, and a power driven shaft rotatably supported by said carrier means comprising: body means; means for attaching said body means to the carrier means so that said body means will reciprocate with said carrier means; said body means including a piston chamber; piston means disposed in said piston chamber and connected with said frame; combination motion transmitting and pump means including a source of fluid, carried by said body means operatively connected with said shaft; a second shaft operatively connected with said combination means; said combination means driving said second shaft at a different speed than that of said first driven shaft; means on said second shaft for receiving and operating a tool; conduit means on said body means for communicating said pump means with said chamber; said combination means operating responsive to rotation of said power driven shaft to pump fluid into said chamber; and valve means connected with said conduit means for controlling fluid flow from said pump means to said chamber and consequent relative movement between said body means and piston means.

7. An attachment for a machine having frame means, carrier means reciprocable on said frame means, and a power driven shaft rotatably supported by said carrier means comprising: body means; means for attaching the body means to the carrier means for reciprocation with the carrier means; said body means defining a piston chamber; piston means disposed in said piston chamber; means connected with said frame for holding said piston means against movement; motion transmitting means carried by said body means and operatively connected with said power driven shaft; a second shaft operatively connected by said motion transmitting means; means on said second shaft for receiving and operating a tool element; a source of fluid in said body means; conduit means communicating said source with said chamber through said motion transmitting means; said motion transmitting means including relatively fixed and movable gear means serving upon rotation of said power driven shaft to pump hydraulic fluid from said source to said chamber; and valve means connected with said conduit means for controlling fluid flow to said piston chamber to govern relative movement between said body means and said piston means.

8. An attachment for a machine having frame means, carrier means reciprocable on said frame means, and a power driven shaft rotatably supported by said carrier means; said attachment comprising: body means; means on the body means for attaching the body means to the carrier means for movement therewith; said body means including a piston chamber; piston means disposed in said piston chamber; means connected with said frame for holding said piston against movement relative to said body means; motion transmitting means drivingly connected with said shaft; a second shaft carried by said body means; means connected with said second shaft for receiving and operating a tool; said motion transmitting means including a fixed ring gear and a train of gears rotatable in said ring gear to transmit rotary motion from said power driven shaft to said second shaft; said body having a reservoir for fluid; conduit means for communicating said reservoir with said chamber; rotation of said train of gears also serving to pump fluid from said source through said conduit means to said chamber to effect relative movement of said body means and piston means; and valve means in said body for controlling the flow of fluid to said piston chamber to govern said relative movement.

9. An attachment for a machine having frame means, carrier means reciprocable on said frame means and a power driven shaft rotatably supported by said carrier means; said attachment comprising: body means; means for attaching the body means to the carrier means for reciprocation therewith; said body means including a piston chamber and a reservoir for fluid; piston means disposed in said piston chamber; means connected with said frame for holding said piston means against movement; pump means having a ring gear fixed in said body means; a first pinion in said body means drivingly connected with said shaft; a plurality of pinions in said body means in meshing engagement with said ring gear and said first pinion, rotation of said first pinion causing rotation of said plurality of pinions and movement thereof around said first pinion; conduit means for communicating said reservoir with said chamber through said pump means; rotation of said pinions causing hydraulic fluid to be pumped from said source through said conduit means to said piston chamber to cause relative movement between said body means and said piston means; and valve means carried by said body for controlling the flow of fluid through said conduit means to said piston chamber to govern such relative movement.

10. In combination with a machine having a frame, a carrier reciprocable on said frame for moving a tool into and out of working position, and a power driven shaft rotatably supported by and projecting from said carrier; a body open at one end; means on said body for attaching said open end of said body to the carrier of said machine so that said shaft extends through said open end; said body including a reservoir and a piston chamber; said piston chamber surrounding said shaft; piston means in said piston chamber; means connected with said frame for holding said piston means against movement; pump means in said body drivingly connected with said shaft; conduit means communicating said pump means with said reservoir; and valve means connected with said conduit means operable for controlling fluid flow from said pump means to said piston chamber and relative movement of said body and piston means; and means responsive to relative movement of said body and piston means to actuate said valve means.

11. An attachment for a machine having frame means, carrier means reciprocable on said frame means and a power driven shaft rotatably supported by said carrier means; said attachment including: body means having an open end; means on said body means providing for attachment of the open end of said body means to said carrier with said shaft extending through said open end into said body; said body means defining a reservoir and a piston chamber; said piston chamber surrounding said power driven shaft; means connected with said frame for holding said piston means against movement; motion transmitting means operatively connected with said shaft; a second shaft extending through said reservoir; means on said second shaft for receiving and operating a tool; means drivingly connecting said second shaft with said motion transmitting means; pump means in said body means drivingly connected with the motion transmitting means; conduit means communicating said pump means with said chamber and said reservoir; valve means communicating with said conduit means; said valve means being operative to control flow from said pump means to said piston chamber and consequent relative movement between said body means and said piston means; means operatively connected with said body means and said frame operable responsive to relative movement of said body means and said piston means to effect the operation of said valve means; and means tending to resist relative movement of said body and piston means in one direction, said resisting means being operative to cause a different relative movement of said piston and body means in a predetermined position of said valve means.

12. An attachment for a machine having frame means, carrier means reciprocable on said frame means and a power driven shaft rotatably supported by said carrier means comprising: body means having an open end attachable to said carrier means for movement therewith so that said shaft will extend into said body means through said open end; said body means including a reservoir and a piston chamber; said piston chamber having an open end adjacent said carrier means; piston means disposed in said piston chamber; means adapted to be connected with said frame extending into said chamber through said open end of said chamber for holding said piston means against movement; motion transmitting means operatively connected with said shaft; a second shaft for receiving and operating a tool element; means drivingly connecting said second shaft with said motion transmitting means operable to drive said second shaft at a different speed than that of said power driven shaft; pump means mounted in said body means for operation by said motion transmitting means; conduit means connecting said pump means with said chamber and said reservoir; valve means communicating with said conduit means for controlling flow from said pump means to said piston chamber and relative movement of said body and piston means; and electrical means responsive to relative movement of said body and piston means to effect the operation of said valve means.

13. A feed device for a machine having a frame; a carrier for a work-performing member reciprocable on said frame and a power driven shaft associating with said carrier; said device comprising: a body having means providing for attachment thereof to said carrier, said body providing a reservoir and a piston chamber; said piston chamber surrounding said shaft a piston disposed in said chamber; said piston chamber having an open end adjacent said carrier means; means connected with said piston and extending therefrom through said open end for connection with said frame to hold said piston against movement; pump means drivingly connected with said shaft within said body; conduit means connecting said pump means with said chamber and said reservoir; valve means connected with said conduit means and operable to control flow from said pump means to said piston chamber and relative movement between said body and piston; electrical means for effecting the operation of said valve means; and switch means operatively connected with said frame and said body operable responsive to relative movement of said body and piston to control the operation of said electrical means.

14. A machine having a frame; a carrier for a work-performing element reciprocable on said frame; a power driven shaft rotatably supported by said carrier; a body formed on said carrier movable therewith; said shaft extending from said carrier into said body; said body providing a reservoir and an annular piston chamber; an annular piston in said chamber; said piston chamber surrounding said shaft; means connected with said piston and extending through said annular chamber and connected with said frame to hold said piston against movement; pump means in said body drivingly connected with said shaft; conduit means communicating said pump means with said reservoir and said chamber; valve means connected with conduit means and operable to control flow from said pump means to said chamber and relative movement of said body and piston; and electro-responsive means including elements operatively connected with said frame and said body operable for actuating said valve means at different relative positions of said body and piston, to vary the delivery of fluid by said pump means to said chamber and the rates of relative movement of said body and piston.

15. A machine having a frame; a carrier for a work-performing element reciprocable on said frame means; a power driven shaft rotatably supported by said carrier; a body connected with the carrier for movement therewith; said body having an open end adjacent said carrier; said shaft extending from said carrier through said open end; said body providing a reservoir and a piston chamber; said piston chamber having an open end adjacent said carrier; a piston in said piston chamber; said piston chamber surrounding said shaft; means connected with said frame extending through said open end of said chamber for holding said piston against movement; pump means in said body drivingly connected with said shaft; conduit means connecting said pump means with said reservoir and said chamber; rotary valve means operatively connected with said conduit means; said valve means being operative to control flow from said pump means to said chamber and relative movement of said body and piston means; electro-responsive means for imparting rotary movement to said valve means to change the rates of fluid flow from said pump means to said chamber; and switch means operative at different stages of relative movement of said body and piston for energizing said electro-responsive means.

16. An attachment for a machine having frame means, carrier means reciprocable on said frame means, and a power driven shaft rotatably supported by and projecting from said carrier means comprising: tubular body means formed for attachment to the carrier means of said machine; said body means having an open end adjacent said carrier means for reception of said shaft; said body means defining a reservoir and a piston chamber; said piston chamber surrounding said shaft; piston means disposed in said piston chamber extending toward said carrier means for connection with said machine frame; motion transmitting means operatively connected with said shaft, said motion transmitting means having a second shaft for receiving and operating a tool element; pump means communicating with said reservoir and disposed for operation by said motion transmitting means; valve means communicating with said pump means and said piston chamber, said valve means having a rotatable element operative in different positions to vary the volume of fluid flowing from said pump means to said piston chamber and the rate of relative movement of said body and piston means; electro-responsive means for moving said valve element between said positions; and switch means operative at different stages of relative movement of said body and piston means for energizing said electro-responsive means.

17. A feed device for a machine having a frame, and a rotatable and reciprocable power driven shaft on said frame; said device comprising: a body providing a piston chamber surrounding said shaft; said body having a reservoir for hydraulic fluid axially spaced from said chamber; means mounting said body on said shaft for reciprocation therewith; a piston in said chamber; means connected with said frame holding said piston stationary in said chamber; gear pump means carried by said body; means drivingly connecting said gear pump means with said power driven shaft; means on said body driven by said pump means for supporting and operating a work-performing tool, with said pump means serving as a gear reduction unit in driving said tool supporting means; conduit means in said body connecting said pump with said reservoir and said chamber for supplying fluid under pressure to said chamber for moving said body relative to said piston; and valve means for controlling the flow of fluid through said conduit means.

18. A feed device for a machine having a frame, a carrier mounted to reciprocate on said frame, and a rotatable power driven shaft on said carrier; said device comprising: a body providing a piston chamber and a reservoir for hydraulic fluid; means mounting said body on said carrier for reciprocation therewith; a piston in said chamber; means connected with said frame holding said piston stationary in said chamber; gear pump means carried by said body; means drivingly connecting said gear pump means with said power driven shaft; means on said body driven by said pump means for supporting and operating a work-performing tool, with said pump means serving as a gear reduction unit in driving said tool supporting means; conduit means in said body connecting said pump with said reservoir and said chamber for supplying fluid under pressure to said chamber for moving said body relative to said piston; and valve means connected with said conduit means for controlling flow of fluid between said pump means, said chamber and said reservoir.

19. A feed device for a machine having a frame, a carrier mounted to reciprocate on said frame, and a rotatable power driven shaft on said carrier; said device comprising: a body providing a piston chamber and a reservoir for hydraulic fluid; means mounting said body on said carrier for reciprocation therewith; a piston in said chamber; means connected with said frame holding said piston stationary in said chamber; gear pump means carried by said body; means drivingly connecting said gear pump means with said power driven shaft; means on said body driven by said pump means for supporting and operating a tool; conduit means connecting said pump means with said chamber and said reservoir; valve means on said body connected with said conduit means and operable for controlling flow of fluid under pressure to said chamber for moving said carrier, body and tool toward the work as well as for controlling the flow of fluid from the pump means and chamber to said reservoir; and other valve means connected with said conduit means selectively operable for varying the flow through said conduit means to vary the rate of movement of said carrier and body.

20. A feed device for a machine having a frame, a carrier mounted to reciprocate on said frame, and a rotatable power driven shaft on said carrier; said device comprising: a body providing a piston chamber and a reservoir for hydraulic fluid; means mounting said body on said carrier for reciprocation therewith; a piston in said chamber; means connected with said frame holding said piston stationary in said chamber; gear pump means carried by said body; means drivingly connecting said gear pump means with said power driven shaft; means on said body driven by said pump means for supporting and operating a tool; conduit means connecting said pump means with said chamber and said reservoir; valve means on said body connected with said conduit means and operable for controlling flow of fluid under pressure to said chamber for moving said carrier, body and tool toward the work as well as for controlling the flow of fluid from the pump means and chamber to said reservoir; and means connected with said frame and said body operable to retract said carrier, body and tool from the work responsive to operation of said valve to cause the flow of fluid from the pump means and chamber to said reservoir.

21. A feed device for a machine having a frame, a carrier mounted to reciprocate on said frame, and a rotatable power driven shaft on said carrier; said device comprising: a body providing a piston chamber and a reservoir for hydraulic fluid; means mounting said body on said carrier for reciprocation therewith; a piston in said chamber; means connected with said frame holding said piston stationary in said chamber; gear pump means carried by said body; means drivingly connecting said gear pump means with said power driven shaft; means on said body driven by said pump means for supporting and operating a tool; conduit means connecting said pump means with said chamber and said reservoir; valve means on said body connected with said conduit means and operable for controlling flow of fluid under pressure to said chamber for moving said carrier, body and tool toward the work as well as for controlling the flow of fluid from the pump means and chamber to said reservoir; means connected with said frame and said body operable to retract said carrier, body and tool from the work responsive to operation of said valve to cause the flow of fluid from the pump means and chamber to said reservoir; and other valve means connected with said conduit means selectively operable for varying the flow of fluid through said conduit means to vary the rate of movement of said carrier and body.

22. A device for use in a machine having a frame and a reciprocable carrier on said frame, said device comprising: a cylinder structure; means for mounting said cylinder structure on said carrier in coaxial relation thereto and for reciprocation therewith; said cylinder structure having an annular chamber coaxial therewith; a piston in said chamber; means in said annular chamber and extending toward said carrier for connecting said piston with said frame to hold said piston against movement relative to said cylinder structure; means on said cylinder structure for mounting a work-performing element thereon; and passage means in said cylinder structure affording the application of fluid under pressure to said chamber for moving said cylinder structure relative to said piston to a position whereby said work-performing element may be operated to perform work.

23. A device for use in a machine having a frame and a reciprocable carrier on said frame, said device comprising: a cylinder structure; means for mounting said cylinder structure on said carrier for reciprocation therewith; a piston in said cylinder structure; means extending from said piston toward said carrier for connecting said piston with said frame to hold said piston against movement relative to said cylinder structure; said cylinder structure including concentric tubular sections providing an annular chamber therebetween; said piston being mounted in said chamber; means on said cylinder structure for mounting a work-performing element thereon; and passage means in said cylinder structure affording the application of fluid under pressure into said annular chamber for moving said cylinder structure relative to said piston to a position whereby said work-performing element may be operated.

24. A device for use in a machine having a frame, a carrier reciprocable on the frame and a power driven rotary shaft, said device comprising: a cylinder structure; means for mounting said cylinder structure on said carrier for reciprocation therewith; a piston in said cylinder structure; said cylinder structure having a bore for reception of said shaft; said cylinder structure having an annular chamber surrounding said bore and shaft and in which said piston is disposed; means adapted to be connected with said frame and said piston for holding said piston against movement relative to said cylinder structure; said connecting means extending through said chamber toward said carrier for connection with said frame adjacent said carrier; said cylinder structure having passage means affording the introduction of fluid under pressure to said cylinder structure for moving the cylinder structure relative to said piston; a rotary tool supporting member carried by said cylinder structure; and means carried by said cylinder structure for drivingly connecting said tool supporting member with said power driven shaft.

25. A device for use in a machine having a frame and a carrier reciprocable on the frame, said device comprising: a cylinder structure including concentric tubular sections forming therebetween an annular chamber having an open end; means for mounting said cylinder structure on said carrier for movement therewith with said open end adjacent said carrier; an annular piston in said annular chamber; rods adapted to be connected with said frame and extending into said annular chamber through said open end holding said piston against movement relative to said cylinder structure; tool supporting means carried by said cylinder structure; and passage means in said cylinder structure affording the introduction into said annular chamber of fluid under pressure for moving said cylinder structure relative to said piston in a direction whereby said tool may be operated.

26. A device for use in a machine having a frame and a carrier reciprocable on the frame, said device comprising: a cylinder structure including concentric tubular sections forming therebetween an annular chamber; means for mounting said cylinder structure on said carrier for movement therewith; an annular piston in said annular chamber; rods adapted to be connected with said frame and extending into said annular chamber for holding said piston against movement relative to said cylinder structure; tool supporting means carried by said cylinder structure; passage means in said cylinder structure affording the introduction into said annular chamber of fluid under pressure for moving said cylinder structure relative to said piston in a direction whereby said tool may be operated; and means connected with said cylinder structure and adapted to be connected with said frame for retracting said cylinder structure.

27. A device for use in a machine having a frame, a carrier reciprocable on the frame and a power driven rotary shaft, said device comprising: a cylinder structure including a pair of concentric tubular sections forming therebetween an annular chamber closed at one end and open at the other end; a rotary tool supporting member carried by said cylinder structure; means for securing the upper end of one of said sections to said carrier; said one section receiving therein said power driven shaft; means in said cylinder structure for drivingly connecting said power driven shaft with said tool-supporting member; an annular piston in said chamber; rods in said chamber connected with said piston and engageable with said frame to hold said piston against movement relative to said cylinder structure; and passage means in said cylinder structure affording the application to said chamber of fluid under pressure for moving said cylinder structure relative to said piston to position said tool supporting member for operation of a tool.

28. A power operated feed device for attachment to a machine having a frame, a reciprocable member on said frame and a shaft depending from said reciprocable member and reciprocable therewith; said attachment comprising: a body including tubular members fixed one within the other in surrounding relation to said shaft; means for detachably mounting said body on said reciprocable member with said shaft extending into the inner tubular member; said tubular members providing a chamber therebetween; a piston in said chamber; means in said chamber engaged with said piston and engaging said frame to restrain movement of said piston; tool holding means connected with said body for reciprocation therewith; and means operatively connected with said body affording the introduction of fluid under pressure into said chamber for moving said body relative to said piston.

29. A power operated feed device for attachment to a machine having a frame; a reciprocable member on said frame; and a power operated shaft depending from and reciprocable with said member; said device comprising a body including tubular members fixed in concentric relation to one another; said tubular members having open ends disposed adjacent said reciprocable member; means for detachably securing one of said tubular members to said reciprocable member with said shaft extending into one of said tubular members through the open end thereof whereby said reciprocable member, body and shaft are reciprocable as a unit; said tubular members defining a chamber therebetween, a piston in said chamber; said chamber having an open end facing said frame; means connected with said piston extending from said open end of said chamber for engaging said frame to hold said piston against movement relative to said body; tool holding means carried by said body; and means providing for the introduction into said chamber of fluid under pressure for moving said body relative to said piston.

30. A power operated feed device for attachment to a machine having a frame, a reciprocable member on said frame and a power driven shaft depending from said reciprocable member and reciprocable therewith; said device comprising: a body including tubular members fixed one within the other; means for attaching one of said tubular members to said reciprocable member with said shaft extending into said one tubular member through the end thereof facing said reciprocable member whereby said body, shaft and reciprocable member are reciprocable as a unit; said tubular members defining therebetween a chamber which has an open end facing said reciprocable member; a piston in said tubular member; means connected with said piston and extended from said chamber through said open end for engagement with said frame to hold said piston against movement; means in said body providing for the application of fluid under pressure into said chamber for moving said unit relative to said piston; a rotatable tool holder carried by said body; and means providing a driving connection between said tool holder and said shaft.

References Cited in the file of this patent
UNITED STATES PATENTS

| 2,559,125 | Lee | July 3, 1951 |
| 2,643,555 | Steibel | June 30, 1953 |
| 2,811,877 | De Groff | Nov. 5, 1957 |